United States Patent [19]

Gannon

[11] Patent Number: 5,553,413
[45] Date of Patent: Sep. 10, 1996

[54] FISHING ARROW AND PASSTHROUGH PREVENTION DEVICES

[76] Inventor: Gregory T. Gannon, P.O. Box 780462, San Antonio, Tex. 78278

[21] Appl. No.: 13,424
[22] Filed: Feb. 4, 1993
[51] Int. Cl.⁶ .......................... A63B 65/02; A01K 81/00
[52] U.S. Cl. ................... 43/6; 273/420; 273/423
[58] Field of Search ................ 273/416, 419, 273/420, 421, 422, 423; 43/6

[56] References Cited

U.S. PATENT DOCUMENTS

| 18,458 | 10/1857 | Kelly | 43/6 |
|---|---|---|---|
| 1,168,808 | 1/1916 | Von Hoffmann | 273/416 |
| 2,289,284 | 7/1942 | Chandler | 273/421 |
| 2,876,760 | 3/1959 | Halverson | 124/20 |
| 2,970,839 | 2/1961 | Halverson | 273/106.5 |
| 2,989,310 | 6/1961 | Lamond | 273/106.5 |
| 3,014,305 | 12/1961 | Yurchich | 43/6 |
| 3,945,642 | 3/1976 | Henthorn | 273/421 |
| 4,111,424 | 9/1978 | Schreiber et al. | |
| 4,829,974 | 5/1989 | Anderson | 273/416 |
| 4,905,397 | 3/1990 | Juelg, Jr. | 273/419 |
| 5,094,464 | 3/1992 | Musacchia | 273/419 |

OTHER PUBLICATIONS

Archery Business—Vipor Products advertisement—Oct./Nov., 1991 issue—p. 38.

Primary Examiner—P. Austin Bradley
Assistant Examiner—James Miner

[57] ABSTRACT

A device for bow fishing which renders less likely an arrow will pass completely through an impaled fish. A sliding-stop is oriented on an arrow shaft forward of a drawn, cocked bow. Upon contact with the fish, a pointed head of the arrow passes into the fish, pushing the sliding-stop rearward on the shaft of the arrow, ultimately contacting a fixed stop disposed at a trailing portion of the shaft. Fishing line connects the arrow to the bow to retrieve the fish impaled on the arrow.

18 Claims, 2 Drawing Sheets

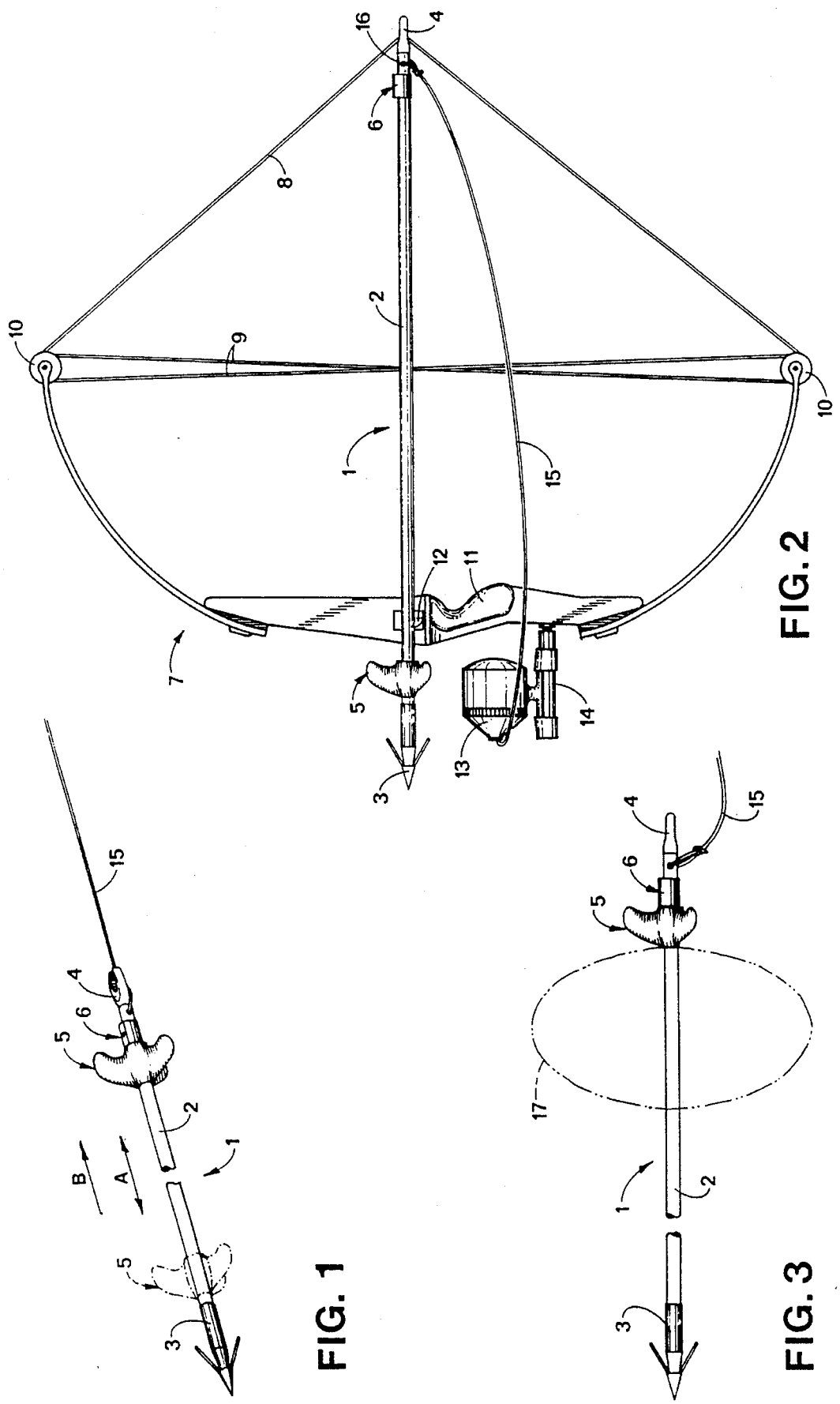

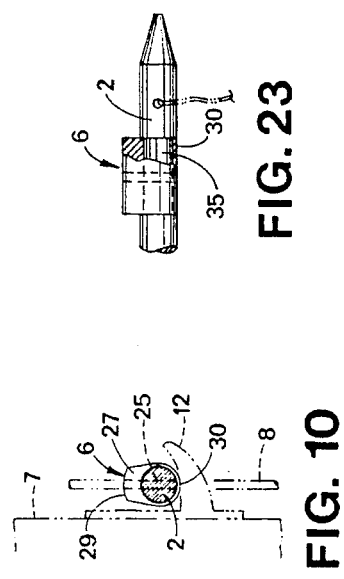
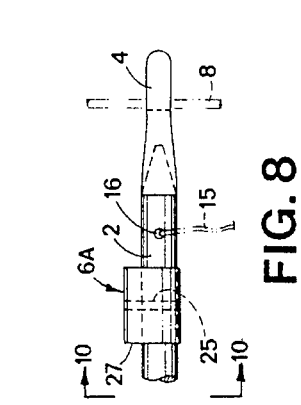
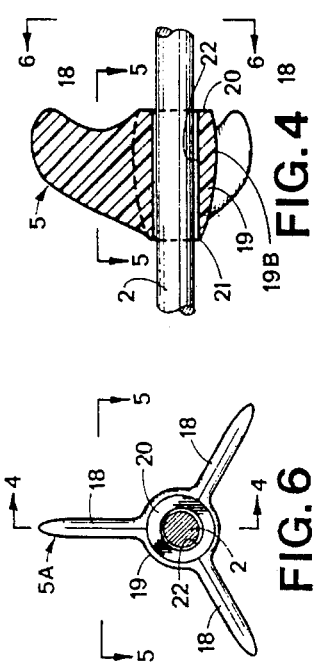
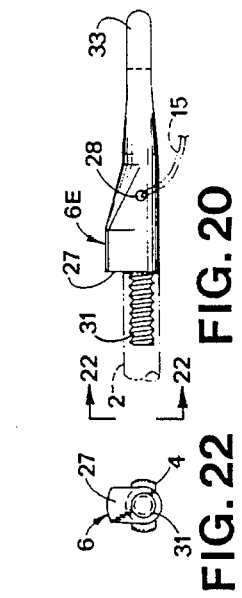
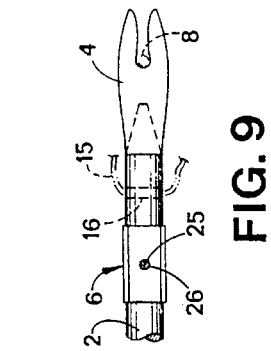
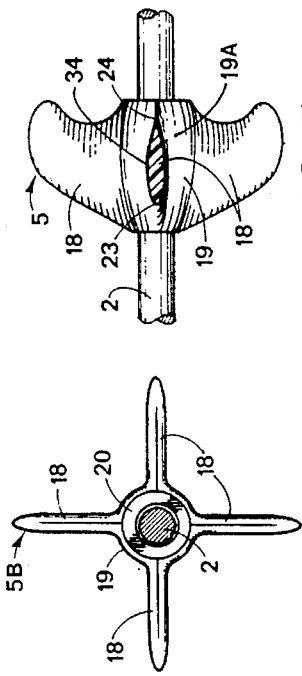
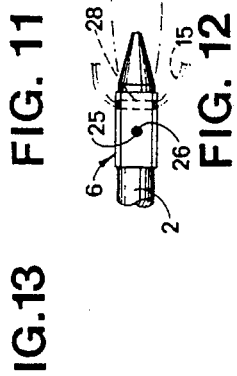

5,553,413

FISHING ARROW AND PASSTHROUGH PREVENTION DEVICES

FIELD OF THE INVENTION

This invention pertains generally to archery equipment and particularly to the structure of arrows used in the sport of fishing with a bow, commonly known as bowfishing.

BACKGROUND OF THE INVENTION

The conventional equipment used for bowfishing generally consists of a fishing reel or spool mounted on the front of a bow. The fishing line has both a trailing end which is secured to the reel or spool and a leading end which is secured to the trailing or rearward end of an arrow. The arrow consists of a head or point secured to the shaft of the arrow at the leading or forward end and a "nock" secured to the trailing or rearward end of the arrow shaft for the purpose of positioning the arrow onto the bowstring prior to the release of the arrow from a cocked or drawn bow.

The following patents reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | PATENT NO. | ISSUE DATE |
| --- | --- | --- |
| Halverson | 2,876,760 | March 10, 1959 |
| Halverson | 2,970,839 | February 7, 1961 |
| Lamond | 2,989,310 | June 20, 1961 |
| Schreiber/Christensen | 4,111,424 | September 5, 1978 |

The Halverson patent issued in March of 1959 is directed solely to a slingshot. Nonetheless, beginning in column 3, the last paragraph thereof, and continuing to the first paragraph on column 4, on the last page of the patent, the inventor discloses the function of washer 48 in conjunction with flanges 47 and 50. Specifically, "the washer 48 acts to slow down the penetration of the arrow 40 into a target 52 as the washer slides back along the body 41 and when the washer 48 reaches the flange 50 further penetration of the arrow 40 is prevented.

The Lamond patent teaches the use of an "arrow brake and indicator device." A device comprising a spike points forward toward the tip of the arrow that is designed to engage the body of the target and then force the device to the rear where it is brought to a stop by the compression of feathers on the arrow. This inventor's brake is split and held in position by means of tape.

The second Halverson patent issued in February of 1961 discloses the use of washer 48 to prevent the penetration of arrow 40. First and second retaining rings, between which is placed washer 48, is called a "retarding collar." This brake is not split but fitted entirely around the arrow.

The Schreiber and Christensen patent provides a removably attachable fletching that imparts draft on an arrow during flight in order to reduce the range of the arrow. The fletching is designed to move from front to rear during flight and come to rest at a stop 21 forward of the normal fletching in an arrow, to "inhibit arrow flight."

Generally arrows are provided with feathers or very thin, flexible plastic vanes, termed fletching, attached to the rearward end of the shaft of the arrow for arrow stability while in flight. However, in the sport of bowfishing, fletching is not required since the stability is provided by the constant tension of the fishing line on the trailing end of the arrow as the line is gradually released form the spool or reel during arrow flight.

The species of fish that legally may be shot: with a bow and arrow are termed "rough fish". This terminology is derived from the typical characteristic that these species of fish have very thick, rough scales and/or skin. Some examples of fish in this category are gar, carp and shark. These fish are normally shot at very close range (20 to 25 feet maximum) primarily due to limited visibility into and through the water. This normal circumstance coupled with the powerful propelling force of conventional bows, particularly those of the compound type, many times results in the projected arrow penetrating through and traveling several feet beyond the body of a fish. Thus, the fish is in contact with the fishing line rather than the arrow, and as a result of the struggle between the fish and archer, the line becomes frayed or cut on the rough scales or skin ultimately resulting in the loss of both the fish and arrow.

SUMMARY OF THE INVENTION

The primary objective of the invention is to provide devices which, when installed on an arrow, arrest the penetration of the arrow and subsequent passing of the arrow completely through the body of a fish shot with the arrow, which would otherwise pass completely through the fish and allows the rough scales or rough skin of the fish to come into contact with the line attached to the trailing end of the arrow, resulting in frayed or cut line and ultimate loss of both the fish and arrow.

Another objective of the present invention is to provide devices indicated above which, when installed on an arrow does not alter the flight or accuracy of the arrow, and which allows for unimpaired penetration and hydrodynamic forward motion through a body of water.

Another objective of the present invention is to provide devices indicated above which, when installed on an arrow, allow for unhampered passage of the arrow past bow components.

Another objective of the present invention is to provide devices of simple, efficient construction which are readily applied to or removed from an arrow.

Briefly, the present invention is embodied within arrow structure providing means by which aerodynamic neutrality and hydrodynamic forward motion through a body of water is maintained and passage of the arrow completely through the body of a fish shot with the arrow is arrested. A first attachment or sliding-stop with a substantially greater frontal surface area than that of the arrow head or point is moveably mounted on the arrow shaft, and by inertia, travels from the front to the rear of the shaft upon release of the arrow by the archer and thereby avoids damaging contact with the bow. A second attachment or fixed-stop, the configuration of which will allow for unhampered passage of the arrow past bow components, is secured to the rearward end of the arrow shaft, to arrest the travel of the sliding-stop at that position.

Other advantageous features and further objectives of this invention will be apparent from the following detailed description taken with reference to the attached drawings.

BRIEF DESCRIPTION OF THE DRAWINGS

FIG. 1 is a fragmentary perspective view on a reduced scale of an arrow with present attachments thereon and the arrow shown in flight configuration, with a sliding-stop shown in phantom lines in its initial or starting position at the head or point of the arrow and in a final indicating position shown in solid lines adjacent a fixed-stop at the rearward end of the arrow.

FIG. 2 is a side elevational view of a compound bow and a fishing reel attached thereto in the conventional manner, with an arrow of present structure and a fishing line conventionally attached to the arrow shown preparatory to release.

FIG. 3 is a fragmentary side elevational view of the arrow of FIGS. 1 and 2 shown in its final rotating position, having penetrated the body of a fish.

FIG. 4 is a fragmentary sectional view of the sliding-stop of the arrow of FIG. 1 taken along line 4—4 of FIG. 6.

FIG. 5 is a fragmentary plan view of the sliding-stop of the arrow of FIG. 1 taken along 5—5 of FIGS. 4 and 6.

FIG. 6 is a rear elevational view of the sliding-stop of the arrow of FIG. 1 taken along line 6—6 of FIG. 4.

FIG. 7 is a view similar to FIG. 6 showing an alternate embodiment of the sliding-stop of the arrow of FIG. 1.

FIG. 8 is a fragmentary side elevational view of the fixed-stop at the rearward end of the arrow of FIG. 1 showing its positioning relative to and the conventional attachment of the fishing line and a nock.

FIG. 9 is a plan view of FIG. 8.

FIG. 10 is a frontal elevational view of the fixed-stop of the arrow of FIG. 1 taken along the line 10—10 of FIG. 8 indicating the relative positioning of the arrow shaft, fixed-stop, arrow rest, bow and bowstring preparatory to the release.

FIG. 11 is a fragmentary side elevational view of an alternative from the fixed-stop of the arrow of FIG. 1.

FIG. 12 is a plan view of FIG. 11.

FIG. 13 is a frontal elevational view of the alternative form of the fixed-stop taken along line 13—13 of FIG. 11.

FIG. 14 is a fragmentary side elevational view of an alternative form of the fixed-stop of the arrow of FIG. 1.

FIG. 15 is a plan view of FIG. 14.

FIG. 16 is a frontal elevational view of the alternative form of the fixed-stop taken along line 16—16 of FIG. 14.

FIG. 17 is a fragmentary side elevational view of an alternative form of the fixed-stop of the arrow of FIG. 1.

FIG. 18 is a plan view of FIG. 17.

FIG. 19 is a frontal elevational view of the alternative form of the fixed-stop taken along line 19—·of FIG. 17.

FIG. 20 is a fragmentary side elevational view of an alternative form of the fixed-stop of the arrow of FIG. 1.

FIG. 21 is a plan view of FIG. 20.

FIG. 22 is a frontal elevational view of the alternative form of the fixed-stop taken along line 22—22 of FIG. 20.

FIG. 23 is a side elevational view of an alternative from the fixed-stop of the arrow of FIG. 1.

DESCRIPTION OF PREFERRED EMBODIMENTS

Referring now to the drawings, wherein applied reference numerals indicate parts similarly identified, and referring first to FIG. 1, the numeral 1 generally designates a fishing arrow of conventional design shown here in flight configuration with devices of the invention attached thereto. The present arrow construction includes a shaft 2 which may be provided with a point or head 3 of the fishing type fitted to a forward end of shaft 2, and a nock 4 attached to a rearward end of shaft 2 in a conventional manner. Disposed on the arrow shaft 2 is a device of the invention, generally designated as sliding-stop 5, which is movable along shaft 2 in the direction of double ended arrow A between head 3 and another device of the invention, generally designated as fixed-stop 6.

Shown in FIG. 2 is a conventional bow 7 of the compound type with arrow 1 positioned thereon preparatory to release. Typically, bows of this design have a bowstring 8, multiple runs of cables 9 entrained about pulleys 10, a handgrip 11, and an arrow rest 12 which supports the forward end of arrow 1 preparatory to release. A fishing reel 13 is attached to a reel support 14 which is secured to a forward side of bow 7. A leading end of fishing line 15 of reel 13 is conventionally attached through a hole 16 adjacent the rearward end of shaft 2 between nock 4 and fixed-stop 6. At this initial stage, sliding-stop 5 is positioned adjacent the head 3 at the forward end of shaft 2.

Upon being shot from bow 7 at sufficient power to produce complete penetration of the arrow 1 through the body of a fish 17 of FIG. 3, by inertia, the sliding-stop 5 moves rearwardly along shaft 2, in the direction of arrow B of FIG. 1, and abuts fixed-stop 6 and there remains disposed. This disposure of sliding-stop 5 and fixed-stop 6 at the rearward end of shaft 2 allows full penetration of head 3 and said shaft through the body of fish 17, but prevents the complete passage of arrow 1 through the fish.

Referring now to FIGS. 4, 5 and 6, a device of the present invention, sliding-stop 5, may be constructed of lightweight, rigid, impact-resistant material, aerodynamically and hydrodynamically shaped to insure reasonable fluidity of forward motion through a body of water. Sliding-stop 5 is comprised of a base 19 slidably disposed on shaft 2 by reason of a lengthwise opening 22 within said base, with the opening 22 being of somewhat greater cross-section than that of shaft 2. Base 19 may be of rearwardly diverging then converging conical configuration with a forward penetrating edge 21 of minimal surface area and a rearward impacting area 20 of substantially larger surface area than that of said forward penetrating edge 21. The transition 19B where base 19 changes from diverging to converging is shown in FIG. 4.

A longitudinally curved outer wall surface 19A (FIG. 5) of base 19 supports aerodynamically and hydrodynamically, radially extending vanes 18 projecting radially outwardly from said base extending along the long axis of base 19. The vanes 19 project at equilateral circumferential spacing to provide a sufficient forward profile for the purpose of arresting complete arrow penetration through the body of a fish because of contact of said vanes with the body of said fish. Vanes 18 are of somewhat teardrop (airfoil/hydrofoil) cross-section with a slightly bulbous rounded leading edge 23 leading to a thickened medial body portion 34 and finally tapering to a sharp trailing edge 24 as shown in FIG. 5. FIG. 4 shows three vanes 18 for stop 5A.

Alternatively, additional vanes 18 may be a preferred embodiment of sliding-stop 5B, as shown in FIG. 7 where four vanes are depicted. In any event, the essence of these versions is to define a stop which is both aerodynamically and hydrodynamically neutral and which thwarts escape of the fish and loss of the arrow.

Another device of the invention, fixed-stop 6A, shown in FIGS. 8, 9 and 10, may be constructed of light weight, rigid, impact resistant material and is secured to the arrow shaft 2 adjacent the rearward end of said shaft by means of a cylindrical shaped, rigid wire or dowel pin 25 disposed into a drilled hole 26 through both fixed-stop 6 and shaft 2. The diameter of pin 25 is preferably not substantially smaller than the inside diameter of hole 26 to insure a friction fit between said pin and said hole. The fixed-stop 6 comprises a longitudinally elongated sleeve of somewhat asymmetrical cross-section having a relatively thin lower land lateral portion 30 and a thickened upper portion 29 with an inside diameter not substantially larger than that of shaft 2. The radial width of impact surface 27 of the forward end of upper wall 29 of fixed-stop 6 is preferably substantially equivalent to the radial width of impact surface 20 of sliding-stop 5 of FIGS. 4 and 6. To insure that impact surface 27 of fixed stop 6 does not make damaging contact with bow 7 or arrow rest 12 upon release of the arrow from said bow, nock 4 is conventionally secured to the rearward end of shaft 2 in a manner such that parallel alignment of pin "215" —25— and bowstring 8 may be achieved as shown particularly in FIG. 10. Specifically impact surface 27 resides on arrow shaft 2 on a side opposite from rest 12. Lower portion 30 does not substantially effect arrow flight when passing over rest 12. As shown in FIG. 23, portion 30 could also be inset on a groove 35 of shaft 2 to provide a smooth transition along the shaft 2.

When shooting a fish with a bow and an arrow of present structure, the velocity of the arrow shot with the bow at such a typically close range target combined with the substantial leading weight of head 3 and the constant stabilizing tension provided for the arrow 1 by the trailing fishing line 15, as shown in FIG. 1, offsets any minimal unbalance of fixed-stop 6, thus negating any hampering of true aerodynamic flight or hydrodynamic forward motion of the arrow. If there is an air dam effect that impact surface 27 may have, it would likely be offset by the placement of the reel 13 below the arrow rest 12 and connection of the line 15 to the nock 4.

An alternative embodiment of fixed-stop 6B, as indicated in FIGS. 11, 12 and 13, incorporates a hole 28 drilled through the stop 6, near upper wall 29 and at the rearward end of fixed-stop 6 providing a means by which fishing line 15 may be attached, thus eliminating the need for hole 16 which passes through shaft 2 as shown in FIGS. 8 and 9. A nock 4 is shown in phantom lines.

Another alternative embodiment of the above device, as shown in FIGS. 14, 15 and 16, comprises fixed-stop 6C and shaft 2 in a one-piece construction, disposing fixed-stop 6 adjacent to a conically shaped rearwardly tapering end 32 of shaft 2. A hole 28 is provided for attachment of fishing line 15. A nock 4 is indicated in phantom lines.

Still another alternative embodiment of fixed-stop 6D is shown in FIGS. 17, 18 and 19. This device is similar to the device described in FIGS. 14, 15 and 16 in that a fixed-stop 6, a conical rearward end 32 and a hole 28 for attachment of fishing line 15 are combined in a one piece construction. However, shaft 2, shown in phantom lines, is an individual part of the arrow assembly. Fixed-stop 6 is secured to shaft 2 by means of a threaded forward end 31 of said stop. The diameter of threaded end 31 of fixed-stop 6 is substantially smaller than that of shaft 2 so that said threaded end may be screwed into the rearward end of shaft 2 until impact surface 27 of fixed-stop 6 abuts rearward end of said shaft. A nock 4 is indicated in phantom line.

FIGS. 20, 21 and 22 show yet another alternative embodiment of fixed-stop 6E which is similar to the device described in FIGS. 17, 18 and 19 in both structure and method of attachment. The primary modification is that an integral nock 33 has been added to facilitate automatic parallel alignment of bowstring 8 and impact surface 27 as shown in FIG. 10.

While the present invention has been described in connection with particular embodiments thereof, it is to be understood that the invention is not necessarily confined thereto, and that any change or changes in the structure of and in the relative arrangements of components thereof are contemplated as being within the scope of invention as defined by the claims appended hereto.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An arrow comprising:

an arrow shaft having a leading end and a trailing end;

a sliding-stop having a neutral hydrodynamic and aerodynamic profile slidably disposed on said shaft, said sliding-stop having a plurality of radially extending vanes oriented parallel to a long axis of a base, said base provided with a central opening parallel to its said long axis loosely overlying said shaft, said base including a leading portion facing towards a point of said arrow, which said leading portion includes a forward edge of minimal cross-sectional surface area and a trailing, fixed-stop impacting area of substantially larger surface area than that of said forward edge; and a fixed-stop secured on said arrow shaft to retard sliding-stop translation on said shaft.

2. The arrow of claim 1 wherein said base has a body portion interposed between said forward edge and said trailing, fixed-stop impacting area of substantially diverging and then converging conical configuration.

3. The arrow of claim 2 wherein said vanes are equispaced around an outer periphery of said base and have a cross-sectional profile of substantially airfoil/hydrofoil cross-section.

4. The arrow of claim 3 wherein said airfoil/hydrofoil cross-section includes a slightly bulbous rounded leading edge which transitions to a thickened medial body portion and finally terminates in a sharp trailing edge.

5. The arrow of claim 4 wherein said fixed stop includes a sleeve provided with securing means to secure said sleeve on the arrow, said sleeve having a relatively thin profile along a lower portion thereof and a thickened upper portion along a leading edge thereof adapted to contact said trailing, fixed-stop impacting area of said sliding-stop.

6. The arrow of claim 5 wherein a nock is integrally formed with said fixed stop.

7. The arrow of claim 5 wherein said fixed stop is integrally formed with said arrow.

8. The arrow of claim 5 wherein said securing means includes a pin passing through said fixed stop of said arrow.

9. The arrow of claim 5 wherein said securing means includes a threaded shaft extending between a terminal portion of said arrow and said fixed stop.

10. A kit for archery, particularly used when bowfishing, said kit comprising:

a sliding-stop having an aerodynamically and hydrodynamically neutral profile provided with means to accommodate a shaft of an arrow, said sliding-stop including having a plurality of radially extending vanes oriented parallel to a long axis of a base, said base provided with a central opening parallel to said long axis loosely overlying said shaft, said base including a leading portion facing towards a point of said arrow which said leading portion includes a forward edge of minimal cross-sectional surface area and a trailing fixed-stop impacting area of substantially larger surface area than that of said forward penetrating edge, said base having a body portion interposed between said forward edge and said trailing fixed-stop impacting area of substantially diverging and then converging conical configuration said vanes being equi-spaced around an outer periphery of said base and have a cross-sectional profile of substantially airfoil/hydrofoil cross-section, and a fixed stop to be attached to the arrow shaft to brake said sliding-stop.

11. The kit of claim 10 wherein said airfoil/hydrofoil cross-section includes a slightly bulbous rounded leading edge which transitions to a thickened medial body portion and finally terminates in a sharp trailing edge.

12. The kit of claim 11 wherein said fixed stop includes a sleeve provided with securing means to secure said sleeve on the arrow, said sleeve having a relatively thin profile along a lower portion thereof and a thickened upper portion along a leading edge thereof adapted to contact said trailing fixed-stop impacting area of said sliding-stop.

13. The kit of claim 12 wherein said securing means includes a pin passing through said fixed stop of said arrow.

14. The kit of claim 12 wherein said securing means includes a threaded shaft extending between a terminal portion of said arrow and said fixed stop.

15. A method for bowfishing, comprising the steps of:

placing a sliding-stop on an arrow, adjacent a leading portion of the arrow, loading an arrow on a bow such that the sliding-stop is forward the bow, tethering the arrow to the bow, and stopping the sliding-stop upon release of the arrow from the bow from removal off the arrow.

16. The method of claim 15 including the step of stopping the sliding-stop from removal off the arrow by providing a fixed stop on the arrow and orienting the fixed stop adjacent a trailing portion of the arrow.

17. The method of claim 16 including tethering the arrow to the bow adjacent the fixed stop.

18. The method of claim 17 including the step of forming the sliding-stop aerodynamically and hydrodynamically to have a substantially narrow leading edge, a trailing edge adapted to contact the fixed stop with sufficient surface therefore and a transition therebetween including a somewhat diverging and then converging body portion and forming a plurality of radially extending vanes which are oriented parallel to a long axis of the leading stop, forming the vanes with a substantially tear drop shape having a bulbous forward portion and a feathered trailing portion.

* * * * *